United States Patent
Engelhardt et al.

(10) Patent No.: US 6,737,635 B2
(45) Date of Patent: May 18, 2004

(54) APPARATUS FOR COMBINING LIGHT AND CONFOCAL SCANNING MICROSCOPE

(75) Inventors: Johann Engelhardt, Bad Schoenborn (DE); Juergen Hoffmann, Wiesbaden (DE); Rafael Storz, Bammental (DE); Heinrich Ulrich, Heidelberg (DE); Joerg Bewersdorf, Heidelberg (DE); Holger Birk, Meckesheim (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/825,273

(22) Filed: Apr. 3, 2001

(65) Prior Publication Data

US 2001/0028031 A1 Oct. 11, 2001

(30) Foreign Application Priority Data

Apr. 4, 2000 (DE) .......................... 100 16 377

(51) Int. Cl.[7] ................................ H01J 40/14
(52) U.S. Cl. .................... 250/225; 250/578.1; 359/349
(58) Field of Search .................. 250/204, 216, 250/225, 552, 578.1, 559.09; 372/26, 27, 21, 32, 68, 18; 359/349, 338

(56) References Cited

U.S. PATENT DOCUMENTS

| | | | | |
|---|---|---|---|---|
| 4,757,268 A | * | 7/1988 | Abrams et al. ............. 359/338 |
| 4,902,888 A | * | 2/1990 | Kondo ........................ 250/225 |
| 5,048,030 A | * | 9/1991 | Hiiro ............................ 372/68 |
| 5,051,575 A | * | 9/1991 | Hino ........................... 250/225 |
| 5,132,950 A | * | 7/1992 | Sato et al. ............. 369/112.28 |
| 5,136,152 A | * | 8/1992 | Lee ............................. 257/433 |
| 5,168,157 A | * | 12/1992 | Kimura ...................... 250/225 |
| 5,233,188 A | * | 8/1993 | Arimoto et al. ............ 250/225 |
| 5,701,201 A | * | 12/1997 | Okazaki ..................... 359/487 |
| 5,744,815 A | * | 4/1998 | Gurevich et al. ....... 235/462.06 |
| 5,808,803 A | * | 9/1998 | Ullmann et al. ............ 359/641 |
| 5,850,140 A | * | 12/1998 | Tokano et al. ................ 324/96 |
| 6,249,381 B1 | * | 6/2001 | Suganuma ................... 359/618 |

FOREIGN PATENT DOCUMENTS

DE  196 33 185 A1  8/1996  .......... G02B/21/00

\* cited by examiner

*Primary Examiner*—David Porta
*Assistant Examiner*—Stephen Yam
(74) *Attorney, Agent, or Firm*—Houston Eliseeva LLP (57) ABSTRACT

The present invention concerns an apparatus for combining light from at least two laser light sources, preferably in the context of confocal scanning microscopy, and in order to make laser light sources of low output power usable as light sources, in particular for confocal scanning microscopy, is characterized in that the light from the laser light sources has at least approximately the same wavelength; and that at least one beam combining unit that combines the light beams in at least largely lossless fashion is provided.

5 Claims, 9 Drawing Sheets

APPARATUS FOR COMBINING LIGHT AND CONFOCAL SCANNING MICROSCOPE

CROSS REFERENCE TO RELATED APPLICATIONS

This invention claims priority of a German patent application DE 100 16 377.7 which is incorporated by reference herein.

FIELD OF THE INVENTION

The present invention concerns an apparatus for combining light from at least two laser light sources. Moreover the invention relates to a confocal scanning microscope which has an apparatus for combining light.

BACKGROUND OF THE INVENTION

Apparatuses of the generic type have been known for some time from practical use, and are utilized principally in cases where light of different wavelengths from several laser light sources is combined into one light beam. In confocal scanning microscopy in particular, it is necessary to combine light from several laser light sources of different wavelengths into one common coaxially proceeding light beam, so as thereby to illuminate the same specimen point with light of the different wavelengths. If the light beams are not combined in exactly coaxial fashion, the undesirable result is several illumination foci at different specimen points.

DE 196 33 185 discloses, per se, a polychromatic point light source for a scanning microscope which has a beam combiner that coaxially combines the light from several laser light sources of different emission wavelengths, the beam combiner being configured as a monolithic unit.

Laser light of different wavelengths from several lasers is usually combined using so-called dichroic beam splitters. These are transparent beam splitter plates which have a coating that possesses a different transmission or emission characteristic as a function of the respective wavelength of the light.

In confocal scanning microscopy, gas lasers or mixed gas lasers whose emission light has wavelengths that are suitable for exciting fluorescent dyes are principally used to illuminate a specimen. Semiconductor lasers or solid-state lasers have hitherto seldom been used in confocal scanning microscopy, although they are considerably more economical than gas lasers in terms of acquisition price. The reason for this is the low output power of semiconductor or solid-state lasers, typically in the range of a few mW. Low-cost helium-neon lasers could also be used at some of the wavelengths of interest for confocal scanning microscopy if their output power were sufficient for the purpose.

SUMMARY OF THE INVENTION

It is therefore the object of the present invention provide a laser light source with an increased power output at a reasonable price.

The above object is achieved by an apparatus for combining light, which comprises at least two laser light sources, each of which defining a light beam wherein the light from the laser light sources has at least approximately the same wavelength; and that at least one beam combining unit which combines the light beams at least largely lossless, wherein the combination of the light beams is accomplished with reference to at least one characteristic property of the light beams.

It is a further object of the present invention to make laser light sources of low output power usable as light sources, in particular for a confocal scanning microscope.

The above object is achieved by a confocal scanning microscope which comprises: at least two laser light sources, each of which defining a light beam wherein the light from the laser light sources has at least approximately the same wavelength; and that at least one beam combining unit which combines the light beams at least largely lossless, wherein the combination of the light beams is accomplished with reference to at least one characteristic property of the light beams.

What has been recognized firstly according to the present invention is that it is not necessary to dispense with the use of economical laser light sources having only low output power if it is possible to combine their light beams in at least largely lossless fashion. The multiple combining of laser light sources of low output power can result in an output power which corresponds to that of one conventional laser, so that the use of a conventional laser having an output sufficient for confocal scanning microscopy can be omitted. The complex and vibration-sensitive air- or water-cooling system of such a laser is thus also, advantageously, not necessary, resulting in a simplified laboratory infrastructure and, in particular, eliminating the irritating noise level of an air cooling system.

In very general terms, beam combination is accomplished with reference to at least one characteristic property of the light beams. A "characteristic property" of the light beams is to be understood in this context as, for example, the polarization.

In the context of confocal scanning microscopy in particular, it is necessary for the combined light from several laser light sources to proceed exactly coaxially, since the several light sources then have a single common illumination focus.

In terms of the dimensioning of the beam combining unit, it is very advantageous if the light beams proceed in collimated fashion. As a result, the beam cross section of the beam path is the same at all points in the beam combining unit, so that as compared to a divergent beam path, a compact design is possible.

In a concrete embodiment, linearly polarized light from two laser light sources is combined together. The light of most lasers is in any case linearly polarized, so that no further actions are necessary in order to utilize the advantages resulting therefrom, for example a small number of optical components.

Four different characteristic properties of the light, on the basis of which the beam combination according to the present invention is performed, are discussed below. These are:

the polarization of the light;
the phase of the light;
the pulse profile over time of the light; and
the identical numerical aperture of a glass fiber.

In a concrete embodiment, light combination on the basis of polarization as the characteristic property of the light could be performed with the aid of a polarization beam splitter. A Glan-Thompson prism is preferably suitable for this. The polarization beam splitter preferably combines light beams whose polarization directions are substantially perpendicular to one another.

The polarization direction of the light from the one laser light source is set in such a way that it is deflected by the polarization beam splitter. The polarization direction of the light from the other laser light source is set in such a way that it passes through the polarization beam splitter. Assuming a suitable relative arrangement of the light beams that are to be combined, the result is a combined, coaxially proceeding light beam from the two laser light sources.

In an alternative embodiment, a polarization beam splitter and a Faraday rotator are arranged between two light beams from two laser light sources proceeding coaxially with one another in opposite directions. The polarization direction of the light from the first laser light source is set in such a way that it passes through the polarization beam splitter. The polarization direction of the second laser light source is set in such a way that after passing through the Faraday rotator arranged after the polarization beam splitter, it is at least largely parallel to the polarization direction of the light from the first laser light source. The light from the two laser light sources accordingly has the same polarization direction, specifically between the Faraday rotator and the second laser. The light from the first light source can penetrate into the second laser if the wavelength of the first laser light source conforms to the resonant wavelength of the resonator of the second laser. If the resonance condition is not met, the light from the first laser light source is for the most part reflected at the coupling-out mirror of the second laser light source. In both cases, the light from the two laser light sources now proceeds coaxially in the same direction, assuming suitable alignment of the optical components.

The Faraday rotator is configured in such a way that it rotates the polarization direction of a laser beam substantially 45°. The Faraday rotator thus rotates the polarization direction of the light from the first laser light source 45° after it has passed through the polarization beam splitter, and conforms to the polarization direction of the second laser. After reflection of the laser light from the first laser light source at a mirror of the second laser light source, the two light beams, now coaxially combined, propagate in the direction of the Faraday rotator, which rotates the polarization direction a further 45° as they pass so that the polarization direction of the light beam from the first laser light source is substantially perpendicular to the polarization direction of the two coaxially combined light beams. The polarization beam splitter, preferably configured as a Glan-Thompson prism, now deflects the two combined light beams so that the deflected, coaxially proceeding, combined light beams can be used for illumination in the confocal scanning microscope.

A fiber Y-coupler could be provided as the beam combining unit. In this context, in order to combine the light beams from two laser light sources, the polarization direction of the light from the one laser light source must be set in such a way that the light of the non-continuous glass fiber of the fiber Y-coupler is coupled into the continuous glass fiber at the coupling point. The polarization direction of the light from the other laser light source must be set in such a way that the light at the coupling point remains in the continuous glass fiber of the fiber Y-coupler. The light emerging from the continuous glass fiber can be used to illuminate a confocal scanning microscope. Preferably, a polarizing fiber Y-coupler is used as the beam combining unit. This fiber Y-coupler comprises polarizing glass fibers which allow the coupled-in light to be transmitted in almost lossless fashion, and in that context linearly polarize the light. With a polarizing fiber Y-coupler, an exact adjustment of the polarization direction of the light from the two laser light sources would therefore advantageously not be necessary.

A double-refracting optical element or an acousto-optical tunable filter (AOTF) could furthermore be provided as the beam combining unit. In this context, the polarization direction of the light from the first laser light source must be set in such a way that it at least largely conforms to the polarization direction of the extraordinary beam of the beam combining unit. The polarization direction of the light from the second laser light source must be set in such a way that it at least largely conforms to the polarization direction of the extraordinary beam of the beam combining unit. In this fashion, beam combination can again be accomplished in almost lossless fashion utilizing the double refraction effect.

Beam combination could be based on the characteristic property of the phase of the light of the light beams that are to be combined. In this context, beam combination is accomplished in accordance with the time reversal of a beam division at an interface or at a beam splitter plate. The "time reversal of a beam division at an interface" is to be understood in this context to mean that two light beams coming from different directions can be combined at an interface into one single light beam if both light beams have exactly the same wavelength and polarization direction, and moreover have exactly the same phase relationship with one another. Then and only then can the two light beams interfere constructively and ultimately be combined into one light beam. The reason is that the light beam that is to be reflected at the beam splitter plate then has no component which is transmitted through the beam splitter plate.

For this purpose, provision is made in particular for the light from the further laser light sources to be combined with beam splitter plates. For largely lossless beam combination of the light from several laser light sources, it is necessary for the light beams from the laser light sources that are to combined to have a well-defined phase relationship. A phase relationship or phase equalization of this kind between several laser light sources can be achieved by corresponding synchronization of the laser light sources. For phase equalization, light from a first light source is first divided into several partial beams. The divided partial beams are then respectively coupled into the further laser light sources. The coupling of a partial beam into one of the laser light sources can be accomplished at any mirror of that laser light source.

To prevent any feedback of light into a laser light source, an optical diode is placed before or after it. The optical diode is preferably embodied as a Faraday rotator. The use of a Faraday rotator in conjunction with a Glan-Thompson prism or an acousto-optical modulator (AOM) or an optical circulator is also conceivable.

One important prerequisite for this beam combination is that the laser light sources have a coherence length that is at least of the order of magnitude of the physical dimensions of the beam combining apparatus. Phase matching of the individual laser light sources is also provided for. Phase matching could be accomplished, for example, with two wedge-shaped optical components placed together. These two components could be displaced with respect to one another transversely to the optical axis, the thickness of the resulting plate thereby being adjustable. Depending on the wedge angle between the two components, the thickness of the resulting plate can be varied very sensitively. As a result, the optical path of the light that passes through the optical component can be varied relative to the other light beams, so that the phase of that light beam can be matched. A phase matching means of this kind could be placed before or after each laser light source. Whether and where it is to be provided depends on the concrete implementation of the overall beam path. Alternatively, phase matching could be performed by displacing the laser light sources together with the beam splitter plates or mirrors associated with them.

In the case of pulsed laser light sources, the pulse profile over time could be provided as a further characteristic property for combining the light beams.

An acousto-optical deflector (AOD) or electro-optical deflector (EOD) is provided as the beam combining unit for this purpose.

The pulsed laser light sources emit light pulses synchronously with one another. The pulses of the laser light sources are offset in time with respect to one another. Synchronization of the pulsed laser light sources could be achieved by the fact that the pulse-train frequency of each laser light source is in almost exact conformity. A corresponding matching between the time offsets of the laser light sources can be accomplished by inserting optical elements into the respective partial beam path, the optical elements each having a different optical path and thus a different transit time.

The light beams from the pulsed laser light sources strike the beam combining unit from different directions. The individual light pulses are deflected, by a corresponding activation of the AOD or EOD, in the direction of a coaxially proceeding light beam. In this context, the activation of the beam combining unit, embodied as an AOD or EOD, is synchronized with the pulse train of the laser light sources.

Beam combination could be based on the characteristic property of the identical numerical aperture of a glass fiber. For this purpose, the glass fiber is preferably embodied as a single-mode fiber. For beam combination, light from at least two laser light sources is focused onto one end of a glass fiber. The goal in this context is for almost the entire light intensity of each laser light source to be focused into the entrance aperture of the glass fiber.

If the required light output of two combined light beams is not sufficient for adequate illumination of a specimen, cascaded beam combination of several laser light sources is provided for. In very general terms, the combined light beam from two laser light sources is combined with a further light beam from a third laser light source. Ultimately the process of combining two input light beams into one output light beam can be performed as often as desired and in any manner desired, so that the available light output can be scaled.

In particularly advantageous fashion, polarizing glass fibers are used for this purpose. Light in any desired polarization state has a linear polarization after passing through a polarizing glass fiber of this kind. Polarizing glass fibers are similar in construction to polarization-retaining glass fibers, and have become commercially available.

The combined light from at least two laser light sources generally has two polarization directions perpendicular to one another. This combined light could be coupled into a polarizing glass fiber, which would result in a linear polarization. The light that emerges from the glass fiber could then be combined with at least one further light beam; the further light beam could also be the result of combining two laser light sources.

Alternatively or in addition thereto, cascading of several polarizing fiber Y-couplers is provided for.

Cascaded beam combination is also conceivable in the embodiment having two light beams from two laser light sources proceeding coaxially in opposite directions from one another, and having a polarization beam splitter and Faraday rotator. For this purpose, a polarization beam splitter and a Faraday rotator are placed after the combined light from the two first laser light sources. A light beam from a third laser light source proceeds in the opposite direction, coaxially with the combined light beam from the two first laser light sources. The polarization direction of the third laser light source is set in such a way that it is at least largely parallel to the polarization direction of the combined light from the first two laser light sources after passing through the second Faraday rotator located after the second polarization beam splitter. The light from the third laser light source, together with the light from the first two laser light sources reflected at a mirror of the third laser light source, is deflected by the polarization beam splitter so that the now-combined light of the three laser light sources can be used as illumination for a confocal scanning microscope.

In all the embodiments, the light that is to be combined is light from identical lasers and/or light from at least similar lasers and/or light from lasers of different types.

BRIEF DESCRIPTION OF THE DRAWINGS

There are various ways of advantageously embodying and developing the teaching of the present invention. Reference is made to the drawings. In the drawings.

DETAILED DESCRIPTION OF THE INVENTION

Figure 1:
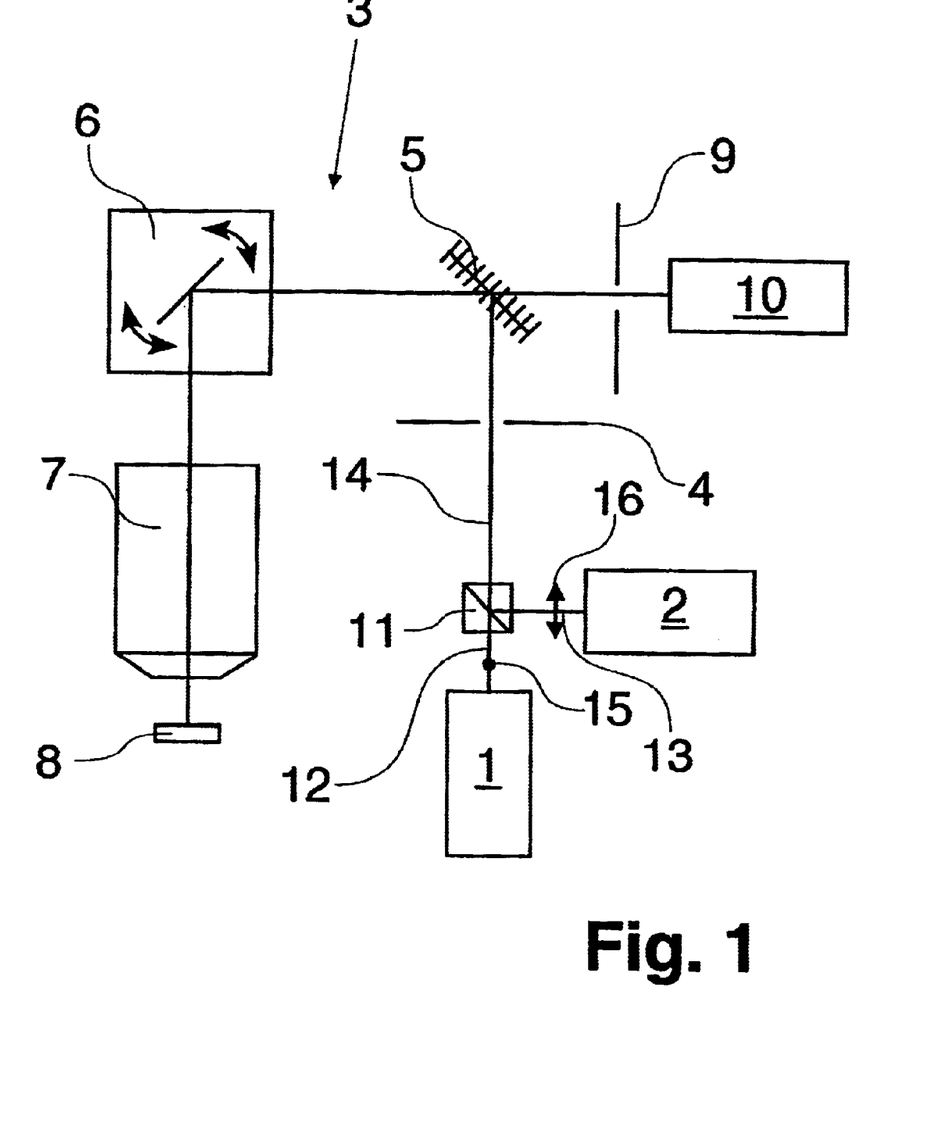
FIG. 1 schematically depicts an apparatus for combining light from two laser light sources in conjunction with a confocal scanning microscope.

FIG. 1 shows an apparatus for combining light from two laser light sources 1, 2 of a confocal scanning microscope 3. The combined light from the two laser light sources 1, 2 passes through excitation pinhole 4 and is reflected by a dichroic beam splitter 5 in the direction of scanning device 6. The scanned light beam is focused by objective 7 onto a point in specimen 8. The fluorescent light excited by the illuminating light passes through objective 7, and is reflected by scanning device 6 to dichroic beam splitter 5. In accordance with the confocal principle, only fluorescent light from the focus region can pass through detection pinhole 9 and is detected by detector 10.

According to the present invention, the light from laser light sources 1 and 2 has at least approximately the same wavelength, and a beam combining unit 11 which combines the light beams in at least largely lossless fashion is provided. The two laser light sources 1, 2 are in each case a helium-neon laser that emits light with a wavelength of 543 nm. The output power in this context is approx. 1 mW in each case.

Beam combination as shown in FIG. 1 is accomplished with reference to a characteristic property of light beams 12, 13 that are to be combined, specifically on the basis of their polarization.

Combined light 14 proceeds coaxially. In addition, light beams 12, 13, and 14 proceed in collimated fashion in the region of beam combining unit 11.

The light from laser light source 1 is linearly polarized, specifically perpendicular to the plane of the drawing as indicated by the dot in the drawing labeled with reference character 15. The polarization direction of laser light source 2 lies in the plane of the drawing of FIG. 1, as indicated by the arrow having reference character 16.

Beam combining unit 11 is a Glan-Thompson prism that combines together light beams whose polarization directions 15, 16 are substantially perpendicular to one another. In this context, polarization direction 15 of the light from laser light source 1 is set in such a way that it passes through Glan-Thompson prism 11, whereas polarization direction 16 of the light from laser light source 2 is set in such a way that it is reflected by Glan-Thompson prism 11.

Figure 2:
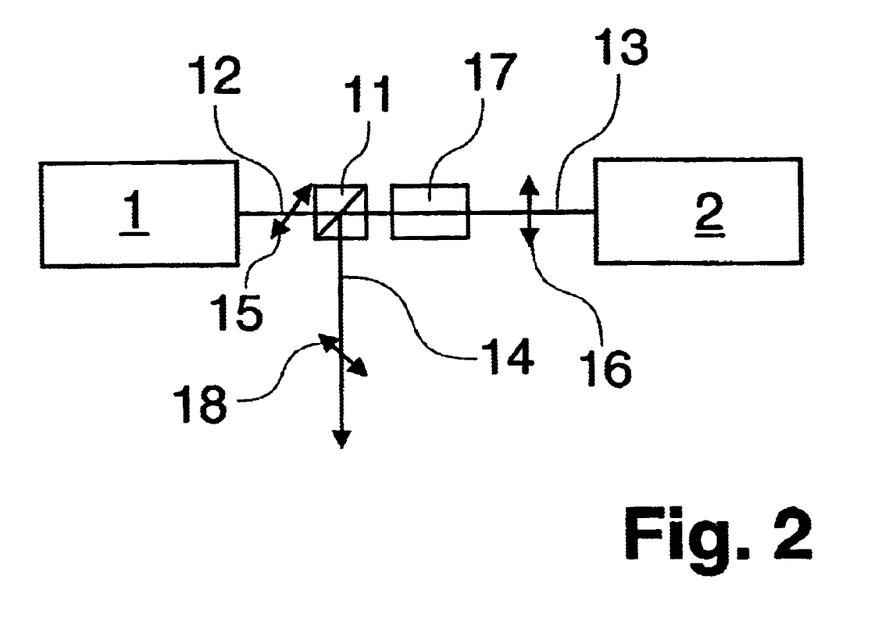
FIG. 2 schematically depicts an alternative exemplary embodiment of the apparatus according to the present invention.

FIG. 2 shows an alternative exemplary embodiment for combining two light beams 12, 13 from two laser light sources 1, 2. The two laser light sources 1, 2 are arranged in such a way that their light beams 12, 13 proceed coaxially in opposite directions. A Glan-Thompson prism 11 and a Faraday rotator 17 are arranged between laser light sources 1, 2. Polarization direction 15 of the light from laser light source 1 is set in such a way that it passes through Glan-Thompson prism 11. Polarization direction 15 is thereby retained. Light beam 12 then passes through Faraday rotator 17, which rotates polarization direction 15 of light beam 12 approximately 45°, so that the rotated polarization direction of light beam 12 is largely parallel to polarization direction 16 of laser light source 2. In the portion between Faraday rotator 17 and laser light source 2, light beams 12 and 13 thus proceed coaxially, in collimated fashion, in opposite directions, and with the same polarization direction 16. The light from laser light source 1 is then reflected at one of the resonator mirrors (not shown) of laser light source 2, so that after the reflection of light beam 12 the latter then proceeds, along with light beam 13, in the direction of Faraday rotator 17. The latter rotates the polarization direction of the two combined light beams 12, 13 a further 45°, so that the polarization direction of the combined light beams 12, 13 is perpendicular to the original polarization direction 15 of laser light source 1. Because of their polarization direction, the combined light beams 12, 13 are reflected by Glan-Thompson prism 11, so that combined light beam 14 can be used for illumination in a confocal scanning microscope. The combined light beam has a polarization direction 18.

Figure 3:
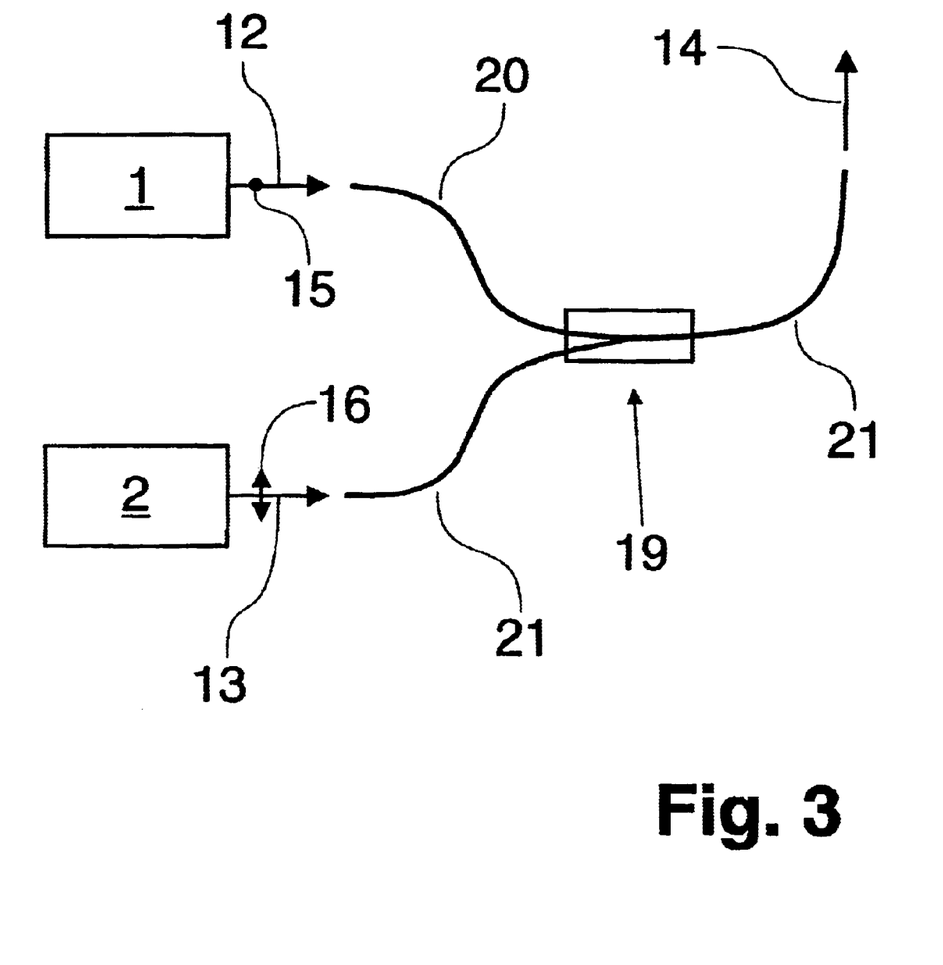
FIG. 3 schematically depicts a further exemplary embodiment of the apparatus according to the present invention.

FIG. 3 shows an apparatus for combining light beams 12, 13 from laser light sources 1, 2 using a beam combining unit embodied as a fiber Y-coupler 19. Laser light source 1 is set in such a way that light 12 emitted by it has a polarization direction 15 that is perpendicular to the plane of the drawing. Laser light 12 is coupled into non-continuous fiber 20. Polarization direction 15 of laser light 12 is set in such a way that it is coupled from non-continuous fiber 20 into continuous fiber 21, specifically at the connecting point of fiber Y-coupler 19. Polarization direction 16 of light 13 from laser light source 2 is set in such a way that is coupled into continuous fiber 21 and remains in it. Fiber Y-coupler 19 thus acts similarly to a Glan-Thompson prism: with it, light beams 12, 13 that are polarized perpendicular to one another can be merged into one combined light beam 14.

Figure 4:
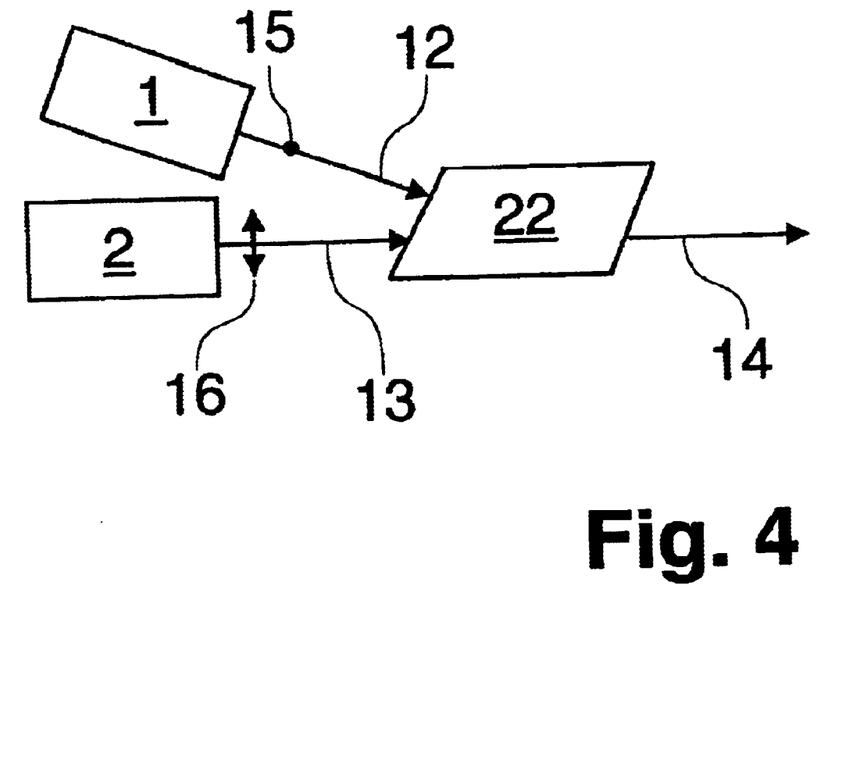
FIG. 4 schematically depicts a further exemplary embodiment of the apparatus according to the present invention.

FIG. 4 shows a further exemplary embodiment in which light beams 12, 13 from two laser light sources 1, 2 are combined. Beam combining unit 22 is configured as a double-refracting optical element, specifically as a double-refracting crystal. Polarization direction 15 of light beam 12 from laser light source 1 is set in such a way that it at least largely conforms to the polarization direction of the extraordinary beam of double-refracting element 22. Polarization direction 16 of light beam 13 from laser light source 2 is set in such a way that it at least largely conforms to the polarization direction of the ordinary beam of double-refracting element 22. Because of the double-refracting properties of optical element 22, the two light beams 12, 13 arriving from different directions are combined in largely lossless fashion into one single light beam 14.

Figure 5:
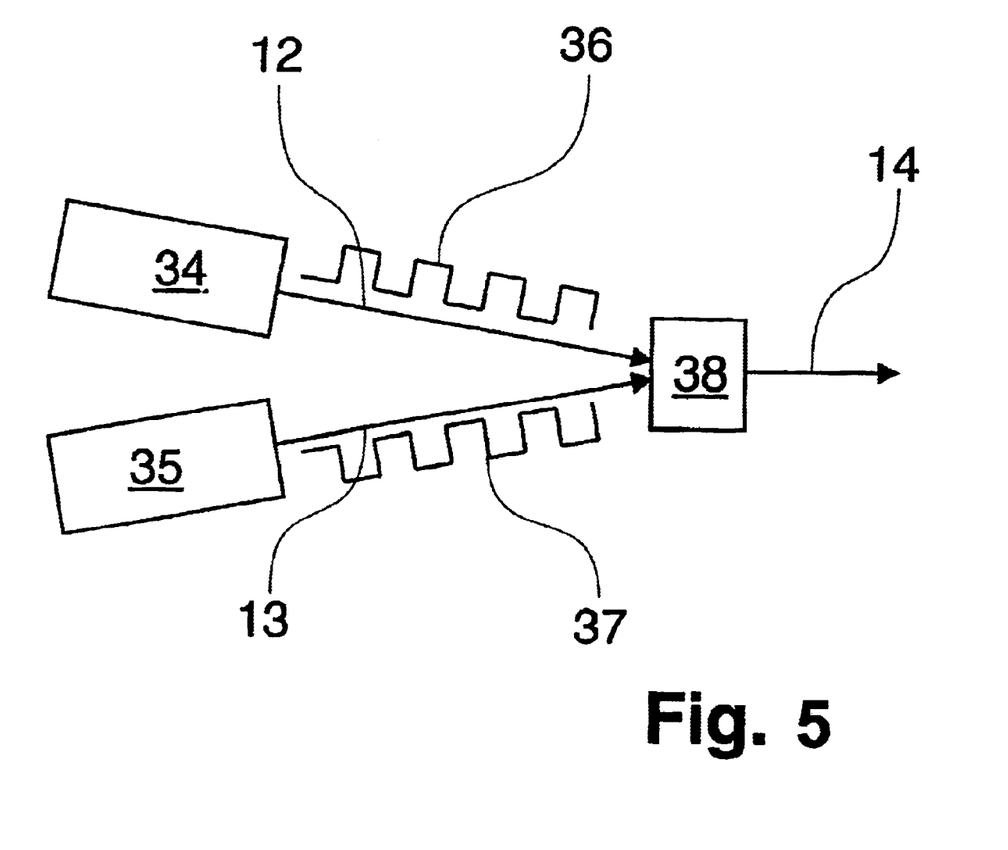
FIG. 5 schematically depicts a further exemplary embodiment of the apparatus according to the present invention.

FIG. 5 shows a further exemplary embodiment of an apparatus for combining light beams 12, 13, in which pulsed laser light sources 34, 35 are used. Beam combination is provided for in this context with respect to pulse profile 36, 37 over time of the pulsed laser light sources 34, 35 as the characteristic property of the light. An acousto-optical deflector (AOD) 38 is provided as the beam combining unit. Laser light sources 34, 35 emit, synchronously with one another, light pulses whose profile is schematically depicted with reference characters 36 and 37, respectively. The profile over time of the individual pulses is offset in time from one another. Light beams 12, 13 come from different directions. By way of corresponding activation of AOD 38, the individual light pulses are deflected in the direction of the coaxially proceeding light beam 14. In this context, AOD 38 is acted upon by an activation curve, in the kHz range, comparable to pulse profile 36.

Figure 6:
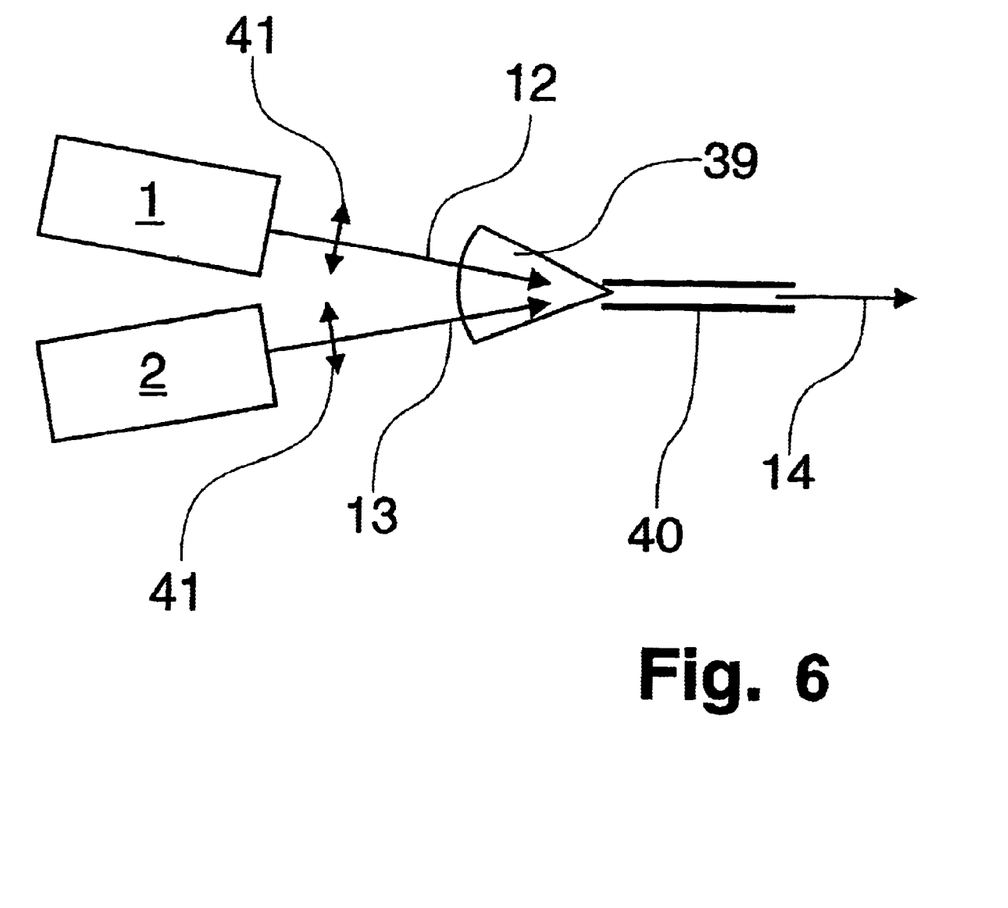
FIG. 6 schematically depicts a further exemplary embodiment of the apparatus according to the present invention.

FIG. 6 shows a further exemplary embodiment of an apparatus for combining two light beams 12, 13 from two laser light sources 1, 2, beam combination being provided with respect to the identical numerical aperture 39 of a glass fiber 40 as the characteristic property. Glass fiber 40 is embodied in this context as a single-mode fiber. Light beams 12, 13 from the two laser light sources 1, 2 are focused with the aid of lenses 41 onto the one end of glass fiber 40. Glass fiber 40 has a numerical aperture 39 at its input end.

Figure 7:
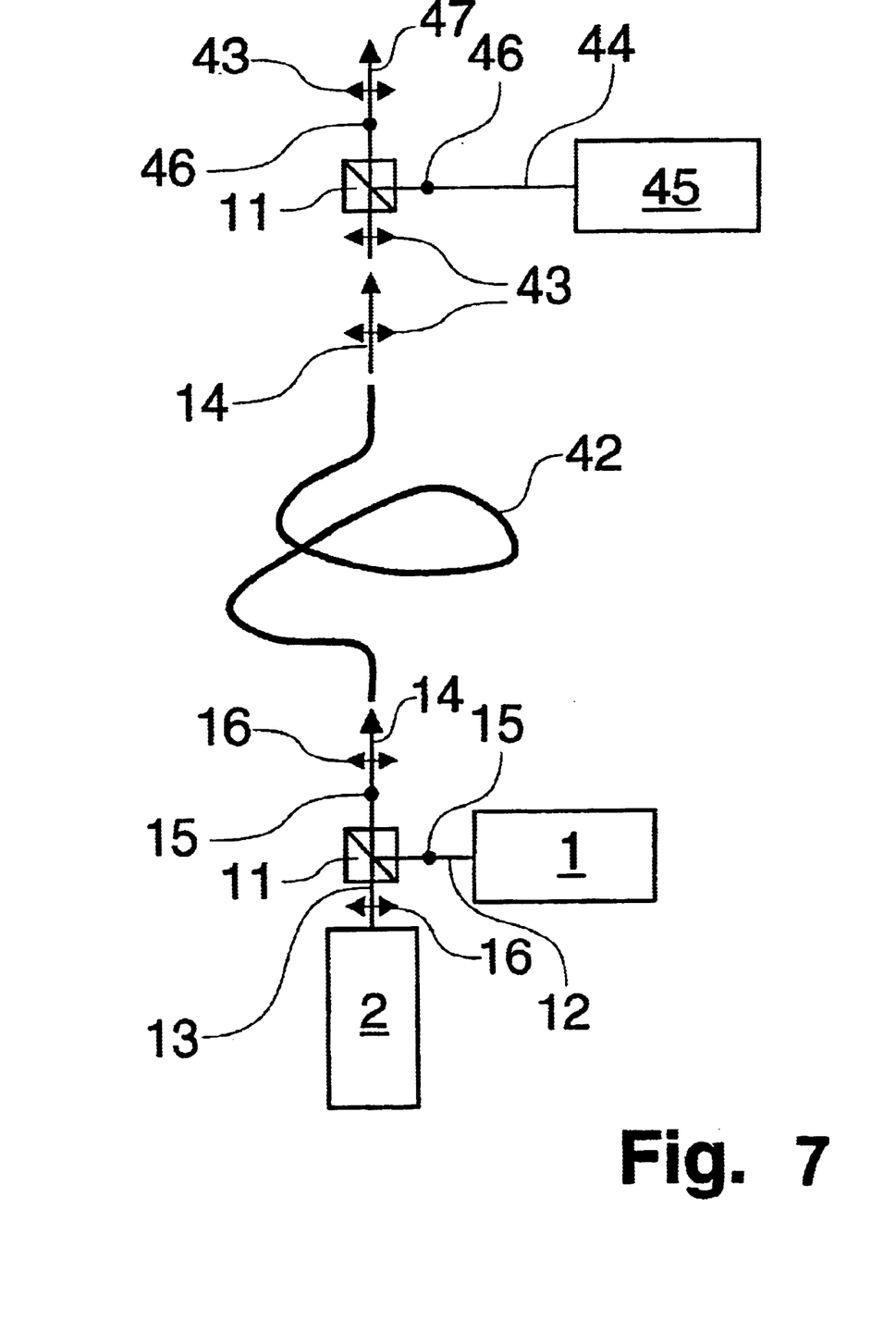
FIG. 7 schematically depicts an exemplary embodiment for cascaded combination of the beams from several laser light sources.

Provision is made in very general terms for a cascaded combination of beams from several laser light sources; a corresponding exemplary embodiment is evident from FIG. 7. Laser light 12, 13 from the two laser light sources 1, 2 is combined with a Glan-Thompson prism 11 into one single light beam 14, ultimately corresponding to the beam combination of the exemplary embodiment of FIG. 1. Combined laser light 14 has the two mutually perpendicular linear polarization directions 15, 16. Combined laser light 14 is coupled into polarizing glass fiber 42. Laser light 14 emerging from polarizing glass fiber 42 has the linear polarization direction 43. Laser light 44 of a further laser 45 having polarization direction 46 is merged, via a further Glan-Thompson prism 11, with linearly polarized light beam 14 to form a combined light beam 47. Combined light beam 47 has the two linear polarization directions 43 and 46. Light beam 47 could in turn be coupled into a polarizing glass fiber in order again to be linearly polarized. That light beam, then linearly polarized, could be combined in the same way, using a further Glan-Thompson prism, with light from a further laser light source.

Figure 8:
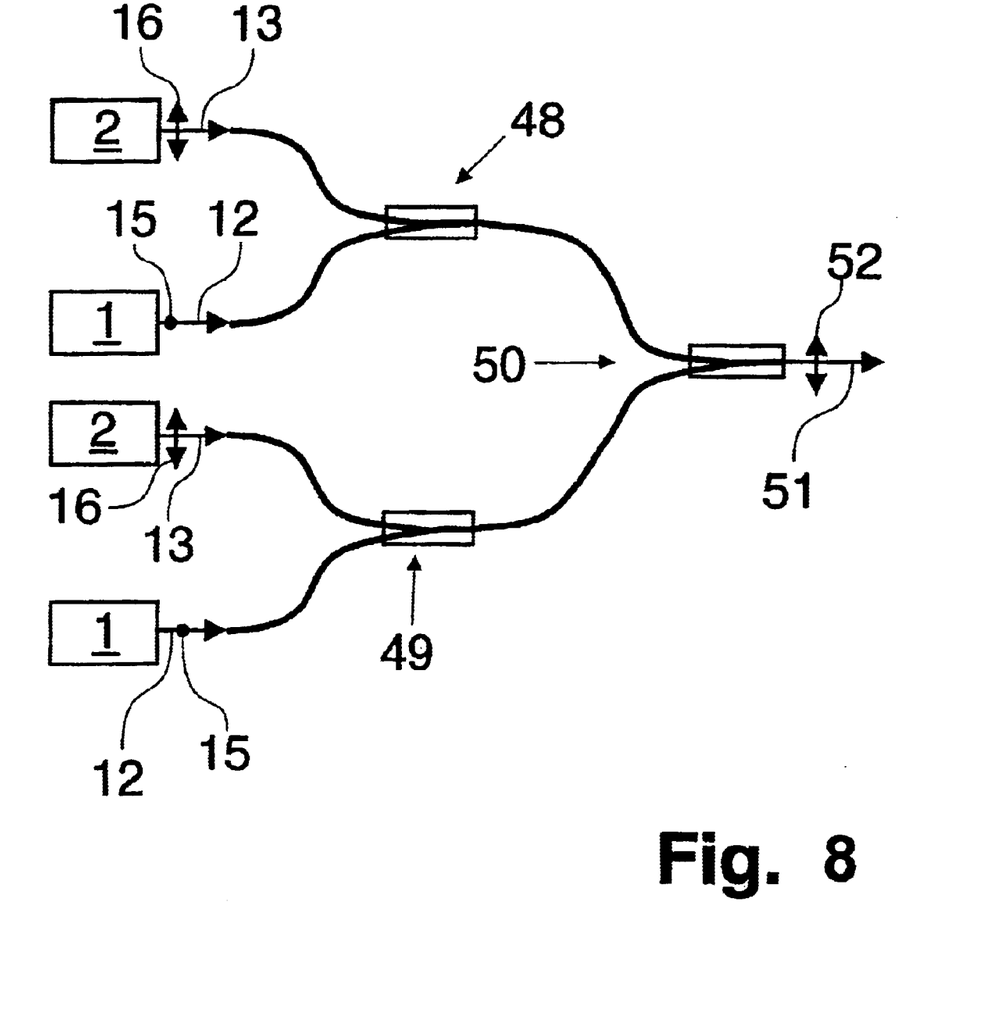
FIG. 8 schematically depicts a further exemplary embodiment for cascaded combination of the beams from several laser light sources.

FIG. 8 shows the cascading of several polarizing fiber Y-couplers 48, 49, 50. Laser light 12, 13 from the two laser light sources 1, 2 is coupled respectively into fiber Y-coupler 48 and fiber Y-coupler 49. In this context, laser light 12 has a polarization direction 15 that is perpendicular to the plane of the drawing, whereas laser light 13 has a polarization direction 16 that lies in the plane of the drawing. After combination of the two light beams 12, 13 using the two fiber Y-couplers 48, 49, this light is in turn added, using polarizing fiber Y-coupler 50, to a combined light beam 51. This combined light beam 51 has a linear polarization direction 52.

Figure 9:
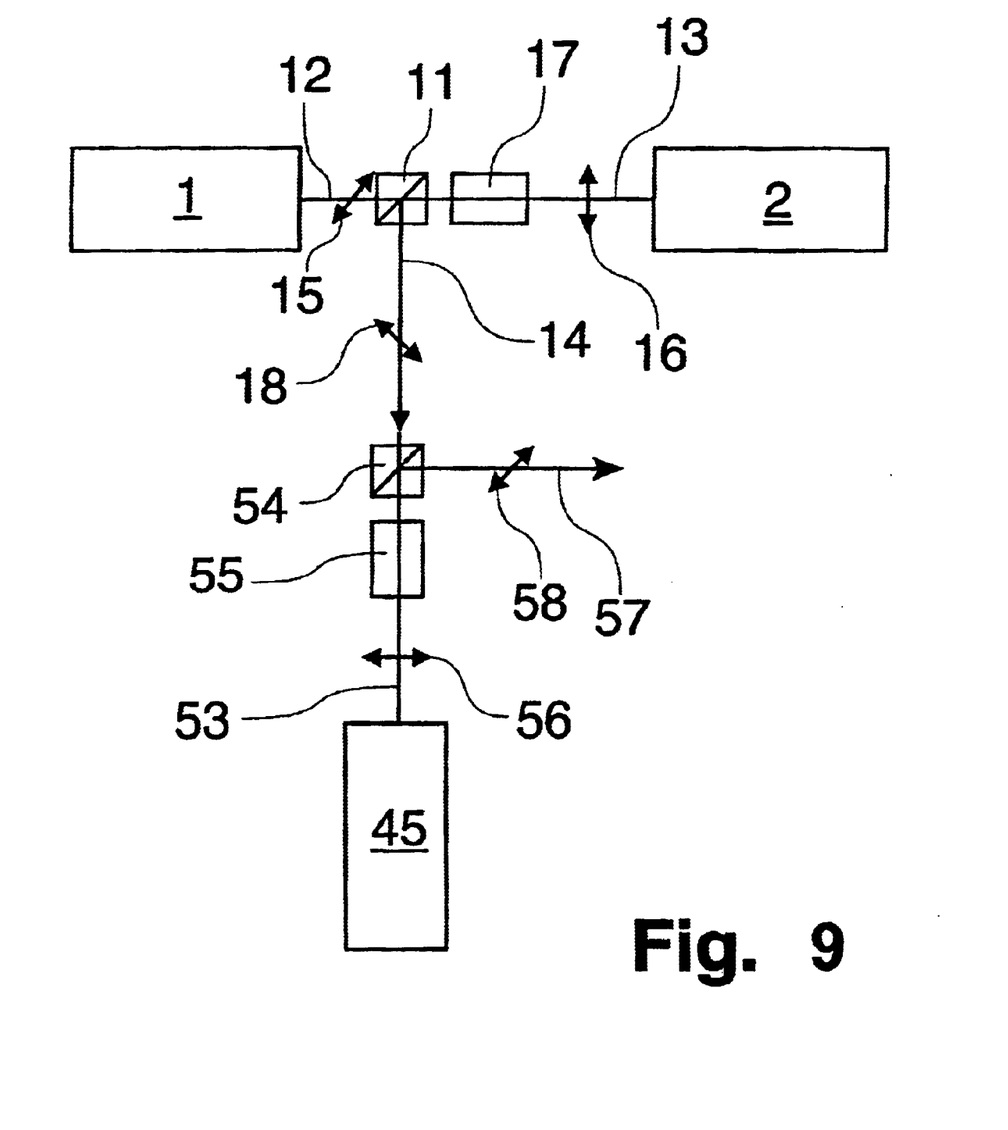
FIG. 9 schematically depicts a further exemplary embodiment for cascaded combination of the beams from several laser light sources.

FIG. 9 shows a cascading of beam combining units as described in the exemplary embodiment of FIG. 2. In this context, laser light 12, 13 from the two laser light sources 1, 2 is combined, as explained with reference to FIG. 2, into one single light beam 14 having a polarization direction 18. Proceeding in the opposite direction from and coaxially with light beam 14 is light beam 53 from a third laser 45. A further Glan-Thompson prism 54 and a further Faraday rotator 55 are arranged between Glan-Thompson prism 11 and third laser 45. Polarization direction 56 of laser light source 45 is set in such a way that after passing through second Faraday rotator 55 located after second polarization beam splitter 54, it is largely parallel to polarization direction 18 of combined light beam 14 of the first two laser light sources 1, 2. Second Faraday rotator 55 also rotates the polarization direction of light beam 14 45°. Light beam 14 is reflected at one of the resonator mirrors (not shown) of third laser light source 45, and now proceeds in coaxially combined fashion with laser light 53 that is emitted by third laser light source 45. The two light beams 14 and 53 pass through Faraday rotator 55, which rotates the polarization direction a further 45° so that this light is deflected by Glan-Thompson prism 54 and is now usable, as combined light beam 57 having a polarization direction 58, for illumination in a confocal scanning microscope. For the exemplary embodiment according to FIG. 9 as well, further cascading of a fourth laser light source would be conceivable.

In conclusion, be it noted very particularly that the exemplary embodiments discussed above serve merely to describe the teaching claimed, but do not limit it to the exemplary embodiments.

What is claimed is:

1. An apparatus for combining light comprising:
at least one beam combining unit provided as a double-refracting optical element;
at least a first laser source emitting a first light beam having a first polarization direction and a second laser source emitting a second light beam having a second polarization direction, the first and the second light beams having approximately the same wavelength; and
the first polarization direction conforming to that of an extraordinary beam of the beam combining unit and the second polarization direction conforming to that of an ordinary beam of the beam combining unit;
wherein the beam combining unit combines the first light beam and the second light beam largely lossless and wherein the combination of the first and second light beams is accomplished with reference to at least one characteristic property of the first and second light beams, wherein the light sources are pulsed laser light sources defining a pulse profile over time wherein the pulse profile over time is the characteristic property.

2. The apparatus as defined in claim 1, further comprising an optical diode.

3. The apparatus as defined in claim 1, characterized in that the beam combining unit is configured as an acousto-optical deflector (AOD) (38) or, as an electro-optical deflector (EOD).

4. The apparatus as defined in claim 1, characterized in that the pulses of the laser light sources are offset in time with respect to one another.

5. The apparatus as defined in claim 1, characterized in that the individual light pulses are deflected, by a corresponding activation of an AOD or EOD, in the direction of a coaxially proceeding light beam.

* * * * *